United States Patent
Faissat et al.

(10) Patent No.: US 6,582,762 B2
(45) Date of Patent: Jun. 24, 2003

(54) SPRAYABLE HOT MELT ADHESIVES

(75) Inventors: Michel L. Faissat, Waterloo (BE); Charles L. Sims, Baton Rouge, LA (US); Olivier J. Georjon, Brussels (BE); Anthony G. Karandinos, St. Stevens-Woluwe (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 23 days.

(21) Appl. No.: 09/839,316

(22) Filed: Apr. 20, 2001

(65) Prior Publication Data

US 2002/0039623 A1 Apr. 4, 2002

Related U.S. Application Data

(63) Continuation-in-part of application No. 09/745,394, filed on Dec. 21, 2000, and a continuation-in-part of application No. 09/746,332, filed on Dec. 21, 2000.
(60) Provisional application No. 60/171,715, filed on Dec. 22, 1999, and provisional application No. 60/199,093, filed on Apr. 21, 2000.

(51) Int. Cl.$^7$ .................................................. B05D 5/10
(52) U.S. Cl. ................ 427/208.2; 427/265; 427/407.1; 427/421; 427/422
(58) Field of Search ............................. 427/422, 208.2, 427/265, 407.1, 421

(56) References Cited

U.S. PATENT DOCUMENTS

| | | |
|---|---|---|
| 4,642,269 A | 2/1987 | Kohyama et al. |
| 5,854,354 A | 12/1998 | Ueda et al. |
| 6,084,048 A | 7/2000 | Hozumi et al. |
| 6,121,401 A | 9/2000 | Yamamoto et al. |
| 6,156,856 A | 12/2000 | Saito et al. |
| 6,160,071 A | 12/2000 | Galimberti et al. |

FOREIGN PATENT DOCUMENTS

| | | |
|---|---|---|
| DE | 19944225 A | 3/2000 |
| EP | 0 351 208 A2 | 1/1990 |
| EP | 0 442 045 A | 8/1991 |

(List continued on next page.)

OTHER PUBLICATIONS

Creanova, Geschäftsbereich, "Klebrohstoffe für Hot–melt Anwendungen," Vestoplast, Degussa –Hüls, pp. 1–35, (Aug. 1996).

*Primary Examiner*—Bernard Pianalto (57) ABSTRACT

This invention relates to a process for atomizing, spiral spraying, oscillation spraying or melt blowing propylene copolymers onto a substrate comprising selecting a poly-alpha olefin inter-polymer comprising:

A) from 60 to 94% of units derived from an alpha mono-olefin having from 3 to 6 carbon atoms and B) from 6 to 40 mol % of units derived from ethylene or one or more other mono-olefins having from 4 to 10 carbon atoms and at least one carbon atom more than A); and C) optionally from 0 to 10 mol % of units derived from another copolymerizable unsaturated hydrocarbon, different from A) and B);

wherein the inter-polymer has:

i) an Mw/Mn of 6 or less;

ii) a storage modulus G', determined upon cooling, intersecting a value of 0.3 M Pa at a temperature of less than 85° C.;

iii) a G"/G' ratio of 18 or more when G' is 10 Pa when measured at a frequency of 1 hz; and iv) a viscosity of 5000 mPa·sec or less at 190° C., and atomizing, spiral spraying, oscillation spraying or melt blowing the inter-polymer into a substrate.

Blends of the above copolymers can also be used herein.

46 Claims, 5 Drawing Sheets

FOREIGN PATENT DOCUMENTS

| | | |
|---|---|---|
| EP | 0 124 722 B | 12/1991 |
| EP | 0 263 718 B1 | 4/1992 |
| EP | 0 629 632 A2 | 12/1994 |
| EP | 0 283 164 B1 | 5/1995 |
| EP | 0 716 121 A | 6/1996 |
| EP | 0 339 804 B1 | 7/1997 |
| EP | 0 100 879 B2 | 9/1997 |
| EP | 0 685 495 B1 | 4/1998 |
| EP | 0 622 380 B1 | 9/1998 |
| EP | 0 889 089 A1 | 1/1999 |
| EP | 0 769 505 B1 | 5/2000 |
| WO | WO 84/01156 | 3/1984 |
| WO | WO 96/04320 | 2/1996 |
| WO | WO 97/15636 | 5/1997 |

SPRAYABLE HOT MELT ADHESIVES

PRIORITY CLAIM

This application claims priority from U.S. Ser. No. 60/171,715 filed Dec. 22, 1999; U.S. Ser. No. 60/199,093, filed Apr. 21, 2000; and is a continuation-in-part of U.S. Ser. No. 09/745,394 filed Dec. 21, 2000; and U.S. Ser. No. 09/746,332 filed Dec. 21, 2000.
Inventors
  Michel Faissat
  Charles Sims
  Anthony G. Karandinos
  Olivier Georjon

FIELD OF THE INVENTION

This invention relates to sprayable hot melt adhesives based upon propylene copolymers and methods to apply these hot melt adhesives, particularly in disposables, packaging, labeling, bookbinding, woodworking and other assembly applications and articles produced by such methods.

BACKGROUND OF THE INVENTION

Sprayable hot melt adhesives are desirable for the economic and commercial reasons that they can be thinly, evenly and quickly coated onto a substrate, saving in both time and material, and that they allow better substrate coverage per quantity of adhesive. Typical sprayable hot melt adhesives comprise an amorphous copolymer, generally a butene based copolymer or a styrene based block copolymer, combined with a tackifier.

For example, U.S. Pat. No. 4,959,207 discloses sprayable hot melt adhesives of butene copolymers having up to 5.5 to 10 weight % ethylene, tackifier and amorphous diluent having a softening point greater than 90° C. Similarly, EP 442 045 A2 discloses sprayable hot melt adhesives of amorphous polyalphaolefins having 3 to 75 weight % $C_4$ to $C_{10}$ alpha-olefin, 25 to 95 weight % propylene 0 to 20 weight % ethylene.

JP-4180981 A addresses the problem of coagulation at the nozzle head by disclosing a hot melt adhesives of wax, bivalent phenol stabilizer, partially maleated or fumarated rosin ester tackifier and ethylene copolymer of ethylene mono-carboxylic vinyl ester/acrylic ester and suggesting that they will not clog the nozzle head when sprayed. However, when actually sprayed these hot melt adhesives will not produce a regular even pattern.

Similarly, WO 94 10256 discloses ethylene copolymer blends for hot melt adhesives. However these blends are not suggested for use in spraying applications.

The instant application relates to U.S. Ser. No. 60/171,715, filed Dec. 21, 1999.

Other references of interest include U.S. Pat. Nos. 6,156,856, 6,160,071, 4,642,269, 5,854,354, EP 0 622 380 B1, EP769 505 B1, EP 685 495 B1, U.S. Pat. Nos. 6,084,048, and 6,121,401.

Thus, this invention provides new sprayable hot melt adhesive compositions based upon propylene copolymers.

SUMMARY OF THE INVENTION

This invention relates a process for atomizing, spiral spraying, oscillation spraying or melt blowing copolymers onto a substrate comprising selecting a poly-alpha olefin inter-polymer comprising:

A) from 60 to 94% of units derived from one alpha mono-olefin having from 3 to 6 carbon atoms, and
B) from 6 to 40 mol % of units derived from ethylene one or more mono-olefins having from 4 to 10 carbon atoms and at least one carbon atom more than A); and
C) optionally from 0 to 10 mol % of units derived from another copolymerizable unsaturated hydrocarbon, different from A) and B);

wherein the copolymer has:
  an Mw/Mn of 6 or less;
  a storage modulus G' intersecting a value of 0.3 MPa at a temperature of less than 85° C. when measured at a frequency of 1 Hz,
  a G"/G' ratio of 18 or more when G' is 10 Pa, and
  a viscosity of 5000 mPa·sec or less at 190° C., and atomizing, spiral spraying, oscillation spraying or melt blowing the inter-polymer onto a substrate.

Blends of two or more different polymers having the above characteristics may also be used in this invention.

DETAILED DESCRIPTION

In a preferred embodiment, component A comprises from 60 to 94 mol % of units derived from one alpha mono-olefin having from 3 to 6 carbon atoms, preferably 65 to 90 mol %, preferably 70 to 80 mol % In another embodiment component B comprises from 6 to 35 mol % of units derived from ethylene or one or more other mono-olefins having from 4 to 10 carbon atoms and at least one carbon atom more than A), preferably 10 to 30 mol %, more preferably 12 to 25 mol %. In another preferred embodiment optional component C comprises from 0 to 10 mol % of units derived from another copolymerizable unsaturated hydrocarbon, different from A) and B), preferably 0.5 to 5 mol %, more preferably 1 to 2 mol %. In another preferred embodiment the content of B) combined with C) is at least 8 mol % and is less than 40 mol %. In a preferred embodiment, the units derived from A) are present at 87 to 73 mole %, the units derived from B) are present at 12 to 25 mole %, and the units derived from C) are present at 1 to 2 mole %.

In another embodiment, component A comprises propylene, butene, pentene or hexene, preferably propylene. In another embodiment, component B comprises, ethylene, butene, pentene, hexene, heptene, octene, nonene or decene, preferably butene, hexene or octene. In another embodiment, component C comprises ethylene, or butene, preferably ethylene, provided that Components A, B and C are different.

Preferred propylene inter-polymers that can be used in the practice of this invention include propylene copolymers having up to 50 mole %, preferably up to 40 mole %, even more preferably from 5 to 30 mole %, even more preferably from about 10 to about 25 mole %, of one or more comonomers. Preferred comonomers may be ethylene and or a $C_4$ to $C_{40}$ linear, branched or cyclic alpha-olefin. In a preferred embodiment the comonomer is a $C_4$ to $C_{20}$ alpha olefin, preferably a $C_4$ to $C_{12}$ alpha olefin and in a particularly preferred embodiments, the comonomer comprises one or more of ethylene, butene-1, pentene-1, hexene-1, heptene-l, octene-1, nonene-1, decene-1, undecene-1, dodecene-1, 3,5, 5-trimethyl hexene-1, 3-methylpentene-1, 4-methylpentene-1 and the like.

In a preferred embodiment, the diad distribution of component A in the polymer has a ratio of experimentally determined diad distribution over the calculated Bemoullian diad distribution of less than 1.07, preferably less than 1.00, more preferably less than 0.95. Preferably when component A is propylene and component B is one or more of hexene, octene or butene.

Diad distribution for a propylene polymer is experimentally determined as follows:

The sample is prepared by dissolving +/−0.5 g of polymer in 2.5 ml of TCB (trichlorobenzene), to which later 0.5 ml of Deuterobenzene is added. The analysis is performed at 300 MHz NMR instrument, at 125 degrees C., the acquisition time is 2 sec, delay 38 sec, full decoupling, 1024 transients. The reactivity ratio of propylene based copolymers is determined using the formula: 4 *PP*XX/(PX+XP)2, where PP is the propylene sequence, PX is the propylene co-monomer sequence, XP is the co-monomer propylene sequence and XX is the co-monomer co-monomer sequence. (When measuring the diads in polymers where A) is propylene, the shift assignment is as follows: 45.5 to 47.5 ppm −PP, 43–45 ppm −PX, and 40–42 ppm −XX, where P is propylene and X is the monomer B). These shifts are relative to a trimethylsilane shift of 0 ppm.) Bernouillian behavior implies that there is no influence from the last comonomer unit in the growing chain on the next one coming in, therefore incorporation is only depended on monomer concentration in the feed. A perfectly Bernouillian system would have a product of reactivity ratios of one ($R_A*R_B=1$, where $R_A$ is the reactivity ratio of component A) and $R_B$. is the reactivity ratio of component B)). Rextac (a Ziegler-Natta propylene copolymer) has a product of reactivity ratios of 1.3. The polymers of the present invention preferably have a product of reactivity ratios of between $0.9<R_A*R_B<1.1$. Therefore the polymers described herein are much more Brendan than the Rextac. In another embodiment, the reactivity ratios of components A) and B) as determined by NMR, have a value of $R_A \times R_B$, of less than 1.4, where $R_A$ is the reactivity ratio of component A) over component B) and $R_B$ is the ratio of component B) over component A).

For more information on techniques to determine diad distributions please refer to the following:

*A $^{13}C$ NMR Determination of the Comonomer Sequence Distribution in Propylene-Butene-1 Copolymers*, by James Randall, Vol. 11, No. 3, May–June 1978, *Macromolecules*, page 592, 1987.

*Polymer Sequence Determination*, J. C. Randall, Academic Press, 1977.

*$^{13}C$ NMR Studies of Zirconocene-catalyzed propylene/1-hexene copolymers: in-depth investigation of the effect of solvent polarity*, Forlini, et al, *Macromol. Chem. Phys.* 201, No. 4 pp. 401–408 (2000).

*Copolymerization of Propylene with 1-Octene Catalyzed by rac-Me2Si(2,4,6-Me3-Ind)2ZrCl2/MethylAluminoxane*, Fan et al, *Journal of Polymer Science: Part A: Polymer Chemistry*, Vol. 38, 4299–4307(2000).

In another preferred embodiment, the interpolymer has a storage modulus G' intersecting a value of 0.3 MPa at a temperature of less than 85° C., preferably at a temperature of less than 70° C., more preferably of less than 60° C., when measured at a frequency of 1 Hz.

In another preferred embodiment, the interpolymer has a G"/G' ratio of 18 or more when G' is 10 Pa, preferably 20 or more, preferably 22 or more, preferably 30 or more, preferably 40 or more, more preferably 50 or more.

In another preferred embodiment the inter-polymers used in this invention have a viscosity of 5000 mPa·sec or less at 190° C. (as measured by ASTM D 3236 at 190° C.); preferably 4000 or less, more preferably 3000 or less, more preferably 2500 or less.

In another preferred embodiment the polyalphaolefin inter-polymers, preferably the propylene polymers, used in this invention have an Mw/Mn of 6 or less, more preferably 5 or less, even more preferably 4 or less, even more preferably 3 or less, even more between 2.5 and 1. In some embodiments the Mw/Mn is preferably from 1.5 to 4, more preferably less than 3, most preferably less than 2.2 and at least 1.6.

In another preferred embodiment the inter-polymers used in this invention have a weight average molecular weight of up to 120,000, preferably 20,000 to 100,000, preferably 20,000 to 90,000, preferably 25,000 to 80,000, even more preferably 30,000 to 70,000, even more preferably between about 40,000 and 60,000.

Molecular weights (weight average molecular weight (Mw) and number average molecular weight (Mn)) are measured by Gel Permeation Chromatography using a Waters 150 Gel Permeation Chromatograph equipped with a differential refractive index detector and calibrated using polystyrene standards. Samples are run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III'" J. Cazes Ed., Marcel Decker, 1981, page 207, which is incorporated by reference herein. No corrections for column spreading are employed; however, data on generally accepted standards, e.g. National Bureau of Standards Polyethylene 1475, should be used to establish a precision with 0.1 units for Mw/Mn calculated from elution times. The numerical analyses are performed using Expert Ease software available from Waters Corporation.

In another embodiment preferred inter-polymers have a Melt Index as measured by ASTM 1238(condition E at 190° C. with a 2.16 kg. Load) of 2000 or less, preferably between 0.1 to 200.

In another preferred embodiment the inter-polymers used in this invention have a melting range of less than 75° C., preferably less than 50° C., more preferably less than 30° C., more preferably less than 25° C. By having a melting point range of less than 75° C. range is meant that the difference between the onset temperature and the end temperature for the polymer is less than 75° C. wide when measured by Differential Scanning Calorimetry (DSC). For purposes of this invention and the claims thereto, the onset temperature is defined as the temperature at which the measured DSC endothermic curve starts to deviate from the baseline and the end temperature is the temperature at which the measured DSC endothermic curve rejoins the baseline of the DSC thermogram.

In a preferred embodiment, the inter-polymers described herein have a melting behavior as determined by DSC, wherein the major peak melting point varies with content of component B) plus C) so that $T_m$ (interpolymer) is less than $153-2.78\times[C_{B+C}]$ for any given concentration of B) and/or C) components. Where $T_m$ is the major melting peak of the interpolymer at a given content of components B) and C) in mol %; $[C_{B+C}]$ is the mol % of component B) plus C).

In another embodiment the inter-polymers of this invention have a major melting peak melting point (Tm) as determined by DSC of 90° C. or less, preferably 80° C. or less, more preferably 70° C. or less.

In another embodiment the inter-polymers, preferably the propylene polymers, of this invention have a major melting peak as determined by DSC of at least 40° C., preferably of at least 50° C. and/or has a melting point as determined by DSC of no more than 130° C., preferably no more than 90° C.

In another embodiment the propylene polymers of this invention have less than 15% crystallinity, preferably less than 10% crystallinity, even more preferably 5% or less crystallinity, even more preferably 1% or less crystallinity.

DSC-peak melting point and crystallinity were determined using a procedure that described as follows. A predetermined amount of sample is pressed at approximately 150° C. to 200° C. to form a film. A central piece of the film (preferably 7 to 12 mg) is removed with a punch die and annealed for 120 hours at room temperature. Thereafter, DSC data is obtained (TA Instruments 2920 temperature modulated DSC) by cooling the sample at −50° C. and subsequently heating it at 10° C./min to 150° C. where it stays isothermally for 5 min before a second cooling-heating cycle is applied. Both the first and second cycle thermal events are recorded. The maximum melting peak is recorded as Tm and the area under the endothermic transition is used to calculate the crystallinity percent. The crystallinity percent is calculated using the formula, [area under the curve (Joules/gram)/B (Joules/gram)]*100, where B is the Hc for the given polymer.

In another preferred embodiment, the polyalphaolefin inter-polymers, preferably the propylene polymers, of this invention are at least 50% amorphous, preferably between 60 and 100% amorphous, even more preferably between 70 and 100% amorphous. Percent amorphous content is determined by Differential Scanning Calorimetry measurement according to ASTM E 794-85.

In another embodiment the propylene polymers of this invention have a glass transition temperature (Tg) as measured by ASTM E 1356 of −5° C. or less, preferably −10° C. or less, preferably −15° C. or less, more preferably between −5° C. and −40° C., more preferably between −10° C. and −30° C.

In another embodiment the propylene polymers of this invention have a heat of fusion of at least 5 J/g, preferably at least 10 J/g and/or no more than 40 J/g, preferably no more than 30 J/g, and most preferably no more than 20 J/g as determined by DSC according to the DSC melting peak and crystallinity method listed below.

In a preferred embodiment the inter-polymer comprises propylene and up to 50 mole % comonomer, said interpolymer having an Mw of between 20,000 to 100,000;

an Mw/Mn of 4 or less:, a G"/G' of 18 or more, when G' is 10 Pa;

a Tg of about −5° C. or less;

a Tm of about 90° C. or less;

an amorphous content of at least 50%, a crystallinity of less than 15%, a heat of fusion of at least 5 J/g, a viscosity of 5000 mPa·sec or less at 190° C.; and a melting range of less than 75° C.

Synthesis

The polymers used in this invention may be produced according to the following procedure:

a predetermined amount of prepurified solvent is transferred into a stainless steel autoclave reactor with internal capacity of 1000 ml. The reactor is maintained under slight positive argon atmosphere at all times. Consequently, a desired amount of 10% wt. solution methylaluminoxane in toluene, (such as that supplied by Aldrich), is transferred into the autoclave. The desired amount of prepurified comonomer is added and the mixture is stirred until stable pressure was reached. The reactor is maintained at a pressure slightly above atmospheric. In succession, a desired amount prepurified propylene is added under stirring. The reactor mixture is heated to the desired temperature. At this reactor temperature a premixed amount of catalyst with solution of 10 wt % methylaluminoxane in toluene is placed in the reactor. The polymerization is conducted for a predetermined period. The soluble in hexane products are precipitated three times in acidified isopropanol. Thereafter, the product is filtered and dried under reduced pressure for 24 hr.

The catalyst systems that can be used to produce these polymers include those single sited catalysts (SSC's) that are generally be suitable for preparing polymers and copolymers from olefinically, vinylically and acetylenically unsaturated monomers.

Preferred SSC's generally contain a transition metal of Groups 3 to 10 of the Periodic Table; and at least one ancillary ligand that remains bonded to the transition metal during polymerization. Preferably the transition metal is used in a reduced cationic state and stabilized by a cocatalyst or activator. Especially preferred are metallocenes of Group 4 of the Periodic table such as titanium, hafnium or zirconium which are used in polymerization in the $d^0$ monovalent cationic state and have one or two ancillary ligands as described in more detail hereafter. Important features of such catalysts for coordination polymerization are the ligand capable of abstraction and that ligand into which the ethylene (olefinic) group can be inserted.

The metallocene can be used with a cocatalyst, which may be alumoxane, preferably methylalumoxane, having an average degree of oligomerization of from 4 to 30 as determined by vapor pressure osmometry. Alumoxane may be modified to provide solubility in linear alkanes but is generally used from a toluene solution. Such solutions may include unreacted trialkylaluminum and the alumoxane concentration is generally indicated by mol Al per liter, which figure includes any trialkyl aluminum which has not reacted to form an oligomer. The alumoxane, when used as cocatalyst, is generally used in molar excess, at a mol ratio of from at least 50 preferably at least 100 and no more than 1000, preferably no more than 500.

The metallocene may be also be used with a co-catalyst which is a non- or weakly coordinated anion (these term non-coordinating anion as used herein includes weakly coordinated anions). The coordination should be sufficiently weak in any event, as evidenced by the progress of polymerization, to permit the insertion of the unsaturated monomer component.) The non-coordinating anion may be supplied and reacted with the metallocene in any of the manners described in the art.

The precursor for the non-coordinating anion may be used with a metallocene supplied in a reduced valency state. The precursor may undergo a redox reaction. The precursor may be an ion pair of which the precursor cation is neutralized and/or eliminated in some manner. The precursor cation may be an ammonium salt as in EP-277003 and EP-277004. The precursor cation may be a triphenylcarbonium derivative.

The non-coordinating anion can be a halogenated, tetraaryl-substituted Group 10–14 non-carbon, element-based anion, especially those that are have fluorine groups substituted for hydrogen atoms on the aryl groups, or on alkyl substituents on those aryl groups.

The effective Group 10–14 element cocatalyst complexes of the invention are, in a preferable embodiment, derived from an ionic salt, comprising a 4-coordinate Group 10–14 element anionic complex, where A⁻ can be represented as:

where M is one or more Group 10–14 metalloid or metal, preferably boron or aluminum, and either each Q is ligand effective for providing electronic or steric effects rendering [(M')Q₁Q₂ . . . Q_n]⁻ suitable as a non-coordinating anion as that is understood in the art, or a sufficient number of Q are such that [(M')Q₁Q₂ . . . Q_n]⁻ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, napthyl and derivatives thereof.

Representative metallocene compounds can have the formula:

where, $L^A$ is a substituted cyclopentadienyl or heterocyclopentadienyl ancillary ligand π-bonded to M; $L^B$ is a member of the class of ancillary ligands defined for $L_A$, or is J, a heteroatom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal; and, D and E are independently monoanionic labile ligands, each having a σ-bond to M, optionally bridged to each other or $L^A$ or $L^B$ The mono-anionic ligands are displaceable by a suitable activator to permit insertion of a polymerizable monomer or macromonomer can insert for coordination polymerization on the vacant coordination site of the transition metal component.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethyl-cyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethyl-cyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl, (tetramethylcyclopentadienyl)(n-propylcyclopentadienyl) zirconium dimethyl; bridged bis-cyclopentadienyl compounds such as dimethylsilylbis(tetrahydroindenyl) zirconium dichloride and silacyclobutyl (tetramethylcyclopentadienyl)(n-propyl-cyclopentadienyl) zirconium dimethyl; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and fluorenyl ligand-containing compounds, e.g., diphenylmethyl(fluorenyl)(cyclopentadienyl)zirconium dimethyl; and the additional mono- and biscyclopentadienyl compounds such as those listed and described in U.S. Pat. Nos. 5,017,714, 5,324,800 and EP-A-0 591 756. All documents are incorporated by reference for purposes of U.S. patent practice.

Preferred metallocenes include bridged chiral bis cyclopentadienyl derivatives which comprise a fused ring system of an indenyl. Suitably these are substituted in the 2-position relative to the bridge. Most preferred are such compounds with no further substitution other than that in the 2 position.

Representative non-metallocene transition metal compounds usable as SSC's also include tetrabenzyl zirconium, tetra bis(trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride.

Additional organometallic transition metal compounds suitable as olefin polymerization catalysts in accordance with the invention will be any of those Group 3–10 that can be converted by ligand abstraction into a catalytically active cation and stabilized in that active electronic state by a noncoordinating or weakly coordinating anion sufficiently labile to be displaced by an olefinically unsaturated monomer such as ethylene.

Exemplary SSC compounds include those described in the patent literature. U.S. Pat. No. 5,318,935 describes bridged and unbridged bisamido transition metal catalyst compounds of Group 4 metals capable of insertion polymerization of α-olefins. International patent publications WO 96/23010, WO 97/48735 and Gibson, et. al., Chem. Comm., pp. 849–850 (1998), disclose diimine-based ligands for Group 8–10 metal compounds shown to be suitable for ionic activation and olefin polymerization. See also WO 97/48735. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. See also the Group 5 organometallic catalyst compounds of U.S. Pat. No. 5,851,945 and the tridentate ligand containing Group 5–10 organometallic catalyst compounds of copending U.S. application Ser. No. 09/302243, filed 29 Apr. 1999, and its equivalent PCT/US99/09306. Bridged bis(arylamido) Group 4 compounds for olefin polymerization are described by D. H. McConville, et al, in Organometallics 1995, 14, 5478–5480. Synthesis methods and compound characterization are presented. Further work appearing in D. H. McConville, et al, Macromolecules 1996, 29, 5241–5243, described bridged bis(arylamido) Group 4 compounds that are active catalysts for polymerization of 1-hexene. Additional transition metal compounds suitable in accordance with the invention include those described in WO 96/40805. Cationic Group 3 or Lanthanide metal complexes for coordination polymerization of olefins is disclosed in copending U.S. application Ser. No. 09/408050, filed Sep. 29, 1999, and its equivalent PCT/US99/22690. The precursor metal compounds are stabilized by a monoanionic bidentate ancillary ligand and two monoanionic ligands and are capable of activation with the ionic cocatalysts of the invention. Each of these documents is incorporated by reference for the purposes of U.S. patent practice.

When using the catalysts of the invention, the total catalyst system will generally additionally comprise one or more organometallic compound as scavenger. Such compounds as used in this application are meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, and isobutyl aluminumoxane. Those compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as activator, any excess over the amount needed to activate the catalysts present can act as a poison scavenger compound and additional organometallic compounds may not be necessary. Alumoxanes also may be used in scavenging amounts with other means of activation, e.g., methylalumoxane and triisobutyl-aluminoxane with boron-based activators. The amount of such compounds to be used with catalyst compounds of the inventions is minimized during polymerization reactions to that amount effective to enhance activity (and with that amount necessary for activation of the catalyst compounds if used in a dual role) since excess amounts may act as catalyst poisons.

The catalysts may be used advantageously in homogeneous solution processes. Random polymerization in homogeneous conditions further promotes the homogeneity of the resulting polymer. Generally this involves polymerization in a continuous reactor in which the polymer formed and the starting monomer and catalyst materials supplied, are agitated to reduce or avoid concentration gradients. Suitable processes include are performed above the melting point of the polymers at high pressure at from 10 to 3000 bar (100–30,000 MPa) in which the monomer acts as diluent or in solution polymerization using an alkane solvent.

Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane is preferred.

Generally speaking, the polymerization reaction temperature can vary from 40° C. to 250° C. Preferably the polymerization reaction temperature will be from 60° C. to 220°. The pressure can vary from about 1 mm Hg to 2500 bar (25,000 MPa), preferably from 0.1 bar to 1600 bar (1–16,000 MPa), most preferably from 1.0 to 500 bar (10–5000 MPa).

The process can be carried out in a continuous stirred tank reactor, or more than one operated in series or parallel. These reactors may have or may not have internal cooling and the monomer feed my or may not be refrigerated. See the general disclosure of U.S. Pat. No. 5,001,205 for general process conditions. See also, international application WO 96/33227 and WO 97/22639. All documents are incorporated by reference for US purposes for description of polymerization processes, metallocene selection and useful scavenging compounds.

Formulations of the Polymers

Tackifiers are preferably not blended with the copolymers of this invention for cost reasons. However if tackifier is desired the tackifiers that may be blended with the copolymers described above are those typically used in the art. Examples include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 140° C., preferably 100° C. to 130° C.

The tackifier, if present, is typically present at about 1 weight % to about 50 weight %, based upon the weight of the blend, more preferably 10 weight % to 40 weight %, even more preferably 20 weight % to 40 weight %. Preferably however, tackifier is not present, or if present, is present at less than 10 weight %, preferably less than 5 weight %, more preferably at less than 1 weight %.

In a preferred embodiment the inter-polymer is combined with less than 3 wt % anti-oxidant, less than 3 wt % flow improver, less than 3 wt % wax, and or less than 3 wt % crystallization aid.

Another optional component of the hot melt composition is a plasticizer or another additives such as oils, tackifiers, surfactants, fillers, color masterbatches, and the like. Preferred plasticizers include mineral oils, polybutenes, phthalates and the like. Particularly preferred plasticizers include phthalates such as diisoundecyl phthalate (DIUP), diisononylphthalate (DINP), dioctylphthalates (DOP) and the like. Particularly preferred oils include aliphatic naphthenic oils.

Another optional component of the hot melt composition is a low molecular weight product such as wax, oil or low Mn polymer, (low meaning below Mn of 5000, preferably below 4000, more preferably below 3000, even more preferably below 2500). Preferred oils include aliphatic naphthenic oils, white oils or the like. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL™ 950 from Exxon Chemical Company. PARAPOL™ 950 is a liquid polybutene polymer having an Mn of 950 and a kinematic viscosity of 220 cSt at 100° C., as measured by ASTM D 445.

The composition may then be applied directly to a substrate as a hot melt adhesive or may be sprayed thereon. Spraying is defined to include atomizing, such as producing an even dot pattern, spiral spraying such as Nordson Controlled Fiberization or oscillating a stretched filament like is done in the ITW Dynafiber/Omega heads or Summit technology from Nordson, as well as melt blown techniques. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fibers sizes can easily be controlled from 20–200 microns by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding.

In a preferred embodiment the composition is applied to a substrate using a spiral spray. Spiral spray is a method used for producing a filamentary spiral application. In one example the hot melt adhesive and spray air are mixed inside the nozzle, eliminating external influences on the spray pattern. In another example, the hot melt adhesive is drawn into a small fiber by high-velocity air jets. The fiber is then rotated by jets until it contacts the substrate, producing a helical pattern from the single strand of adhesive.

In another preferred embodiment the composition is applied to a substrate using oscillation spraying. Oscillating the stretched filaments in the ITW Omega and Nordson Summit technologies is also obtained via multiple hot air jets oriented in the directions required to obtain the desired pattern.

In some embodiments the inter-polymer(s) are sprayed at a machine speed of no less than 50 m/min, preferably no less than 200 m/min, more preferably no less than 400 m/min, most preferably no less than 700 m/min.

In another embodiment the inter-polymer(s) being sprayed have a filament diameter of at least 0.2 mm and no more than 1.0 mm, preferably at least 0.3 mm and no more than 0.8 mm, most preferably at least 0.4 and no more than 0.6 mm.

In another embodiment the inter-polymer(s) being sprayed have a spiral diameter of at least 5 mm and no more than 40 mm, preferably at least 8 mm and no more than 30 mm, and most preferably at least 10 mm and no more than 20 mm.

In a preferred embodiment the sprayed interpolymer has an adhesion to nonwoven coverstock or polyethylene film at about 20° C. of at least 10 g/spiral, preferably at least 30 g/spiral, and most preferably at least 90 g/spiral.

The sprayed hot melt adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Tests and Materials.

All molecular weights are number average unless otherwise noted.

Temperatures at which the storage modulus G' intersects the value of 0.3 MPa were determined with a RMS800 equipment manufactured by Rheometric Scientific, Piscataway, N.J. Dynamic moduli were recorded when decreasing temperature from 120° C. down to −20° C. The output of the test is therefore the evolution of the storage modulus G', the loss modulus G", as well as the ratio tan δ=G"/G' as a function of temperature. Measurements were made at a constant frequency of 1 Hz, using a 12.5 mm diameter plate-and-plate geometry. In order to perform measurements at sub-ambient temperatures, liquid nitrogen cooling device was used throughout the whole test, which was minimizing at the same time the risk of thermal-oxidative degradation at high temperature. In order to compensate for dimension changes during the experiments (thermal expansion of tools and samples, as well as sample shrinkage during crystallization) the gap between the two plates was automatically adjusted so to keep a slight constant compression force on the sample. Due to the broad range of mechanical behavior investigated (from the molten state down to the glassy region), the magnitude of the deformation applied was also adjusted during the test in order to keep the force level between measurable limits, and remain well within the linear viscoelastic region at all times.

Accurate determination of the G"/G' ratio when G' equals 10 Pa requires however different testing conditions. For this purpose, a controlled-stress rheometer, SR-500 also from Rheometric Scientific, Piscataway, N.J., was used with a 25 mm diameter plate-and-plate geometry. Temperature sweeps were conducted at decreasing temperatures and at a constant frequency, starting from a temperature higher than the melting point of the material by at least 30° C. The stress amplitude was set at 5 Pa at the beginning of the experiment, and was allowed to vary throughout the test in order to keep deformation levels within measurable limits (i.e. >1%), while avoiding at the same time to generate too high deformations (i.e. >30%) that could result in having the sample being partially ejected from the gap between the plates. Those skilled in the art will appreciate the need to ensure that measurements are not biased by inertia effects on such low viscosity fluids. A good step is to check that the actual stress generated by the instrument does not significantly deviate from the command stress. This it is common to use a rather thin gap of 0.5 mm between the plates, and to use relatively low frequencies. The output of the test (G"/G' ratio at a given value of G') is frequency independent as long as the data are generated while taking above precautions.

DSC-peak melting point (Tm) and crystallinity were determined using a procedure that described as follows. A predetermined amount of sample pressed at approximately 150° C. to 200° C. to form a film. A central piece of the film (preferably 7 to 12 mg) is removed with a punch die and annealed for 120 hours at room temperature. Thereafter, DSC data was obtained (TA Instruments 2920 temperature modulated DSC) by cooling the sample at −50° C. and subsequently heating it at 10° C./min to 150° C. where it stays isothermally for 5 min before a second cooling-heating cycle is applied. Both the first and second cycle thermal events are recorded. The Tg is taken as the inflection point of the step change on the baseline of the DSC described on the DSC thermogram. The maximum crystallization peak is recorded as Tc. The maximum melting peak is recorded as Tm and the area under the endothermic transition is used to calculate the crystallinity percent. The crystallinity percent is calculated using the formula, [area under the curve (Joules/gram)/165 (Joules/gram)]* 100, (165 is the Hc of PP, for other polymers the HC for that polymer would be used.) The NMR methodology to measure diad distribution was the following. The sample was prepared by dissolving +/−0.5 g of polymer in 2.5 ml of TCB (trichlorobenzene), to which later 0.5 ml of Deuterobenzene was added. The analysis was performed at 300 MHz NMR instrument, at 125 degree C., the acquisition time was 2 sec, delay 38 sec, full decoupling, 1024 transients. The reactivity ratio was determined using the formula: 4*PP*HH/(PH+HP)2. Bemouillian behavior implies that there is no influence from the last comonomer unit in the growing chain on the next one coming in, therefore incorporation is only depended on monomer concentration in the feed. A perfectly Bemouillian system would have a product of reactivity ratios of $r_a*r_b=1$.

Molecular weights (weight average molecular weight (Mw) and number average molecular weight (Mn)) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III'" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for Mw/Mn which was calculated from elution times. The numerical analyses were performed using Expert Ease software available from Waters Corporation.

Viscosity was measured according to ASTM D 3236 at various temperatures (mPaS).

Adhesion NWC/PE was measured by peeling away with an angle of 180° (T-Peel type), at room temperature, and at a speed of 300 mm/min, a specimen of Nonwoven Coverstock (NWC) bonded to a Polyethylene (PE) film, using an adhesive spiral of 20 mm width. 1 linear meter of adhesive spiral weighs 100 mg to obtain an adhesive add-on of 5 g/m2.

Sprayability performance was measured on a CT 325-150 Meltex coater by the ability to form a regular, 20 mm diameter spiral, at increasing machine speeds. The conditions used for the NWC/PE diaper construction test and the determination of the sprayability speed limit are summarized in Table 4 hereafter.

REXTAC RT 2715 is a copolymer of propylene, butene and ethylene having about 67.5 mole percent propylene, about 30.5 mole percent butene and about 2 mole percent ethylene produced by Huntsman, Company. The copolymer has about 11 mole percent BB dyads, 40 mole percent PB dyads and about 49 mole percent PP dyads. The melting point is 76° C. with a melting range form 23 to 124° C. the Tg is −22° C., the crystallinity is about 7 percent the enthalpy is 11 J/g by DSC. The Mn is 6630 the Mw is 51200 and the Mz 166,700 by GPC. Mw/Mn is 7.7.

In the following examples, all parts, proportions and percentages are by weight unless otherwise indicated. All synthesis examples were carried out in dry, oxygen-free environments and solvents. Although the examples may be directed to certain embodiments of the present invention, they are not to be viewed as limiting the invention in any specific respect. The polymers are prepared on a laboratory scale using batch reactors with stirring. In these examples certain abbreviations are used to facilitate the description. These include standard chemical abbreviations for the elements. Melt Index (MI) values in the description and claims were measured according to ASTM D 1238 condition E at 190° C. with a 2.16 kg. load.

The toluene was further dried over a sodium/potassium alloy. Triethylaluminum was purchased from Akzo Nobel. Elemental Analyses were performed by Galbraith Laboratories, Inc.

Preparation of Polymer

EXAMPLE 1

8 liters of prepurified and degassed hexane was transferred into a stainless steel bolted reactor with internal capacity of 15 liters. The reactor had been maintained under slight positive nitrogen atmosphere at all times. Consequently, 40 ml solution of 10% wt. methylaluminoxane in toluene, supplied by Aldrich, was transferred into the autoclave. 400 ml of prepurified hexene was added and the mixture was stirred until stable pressure was reached. The reactor was maintained at a pressure slightly above atmospheric. In succession, 974 g of prepurified propylene was added under stirring. The reactor mixture was heated to 90° C. At this reactor temperature premixed 20 mg of dimethylsilyl-bis(2-methylindenyl)zirconium dichloride (1 mg/1.5 ml of toluene) and 30 ml solution of 10 wt % methylaluminoxane in toluene were placed in the reactor. The polymerization was conducted for 30 minutes. The product which was soluble in hexane was precipitated twice in acidified isopropanol. Thereafter, the product was filtered and dried under reduced pressure for 24 hr. The same procedure was repeated twice and the resulted polymers were mixed together. The total yield was 1850 g.

The average composition as determined by NMR was 90.6% mole propylene and 9.4% mole hexene derived units. The average molecular weights and molecular weight distribution from GPC were: Mn=19 k, Mw=39 k, Mz=60 k, Mw/Mn=2.05.

The DSC average showed Tm=73° C. melting point. The average crystallinity 11%. The average glass transition was −19° C. G"/G' was about 22, when G' was 10 Pa.

EXAMPLE 2

8 L of prepurified and degassed hexane was transferred into a stainless steel bolted reactor with internal capacity of 15 L. The reactor had been maintained under slight positive nitrogenatmosphere at all times. Consequently, 40 ml solution of 10% wt. methylaluminoxane in toluene, supplied by Aldrich, was transferred into the autoclave. 1064 ml of prepurified hexene was added and the mixture was stirred until stable pressure was reached. The reactor was maintained at a pressure slightly above atmospheric. In succession, 1900 g of prepurified propylene was added under stirring. The reactor mixture was heated to 90° C. At this reactor temperature premixed 32 mg of dimethylsilyl-bis(2-methyl-indenyl)zirconium dichloride (1 mg/1.5 ml of toluene) and 30 ml solution of 10 wt % methylaluminoxane in toluene were placed in the reactor. The polymerization was conducted for 30 minutes. The product which was soluble in hexane was precipitated twice in acidified isopropanol. Thereafter, the product was filtered and dried under reduced pressure for 24 hr. The yield was 2190 g.

The composition as determined by NMR was 86.6% mole propylene and 13.4% mole hexene derived units. The molecular weights and molecular weight distribution from GPC were: $Mn=13$, $Mw=40$ k, $Mz=71$ k, $Mw/Mn=3.1$ The DSC showed $Tm=60°$ C. melting point. The crystallinity was 5%. The glass transition was $-19°$ C. G"/G' was about 52 when G' was 10 Pa.

EXAMPLE 3

8 L of prepurified and degassed hexane was transferred into a stainless steel bolted reactor with internal capacity of 15 L. The reactor had been maintained under slight positive nitrogenatmosphere at all times. Consequently, 40 ml solution of 10% wt. methylaluminoxane in toluene, supplied by Aldrich, was transferred into the autoclave. 1160 ml of prepurified hexene was added and the mixture was stirred until stable pressure was reached. The reactor was maintained at a pressure slightly above atmospheric. In succession, 1000 g of prepurified propylene was added under stirring. The reactor mixture was heated to 85° C. At this reactor temperature premixed 20 mg of dimethylsilyl-bis(2-methyl-indenyl)zirconium dichloride (1 mg/1.5 ml of toluene) and 30 ml solution of 10 wt % methylaluminoxane in toluene were placed in the reactor. The polymerization was conducted for 30 minutes. The product which was soluble in hexane was precipitated twice in acidified isopropanol. Thereafter, the product was filtered and dried under reduced pressure for 24 hr. The same procedure was repeated twice and the resulted polymers were mixed together. The total yield was 1170 g.

The average composition as determined by NMR was 79.1% mole propylene and 20.9% mole hexene derived units. The average molecular weights and molecular weight distribution from GPC were: $Mn=19$ k, $Mw=40$ k, $Mz=61$ k, $Mw/Mn=2.1$ The DSC showed average $Tm=42°$ C. melting point. The average crystallinity was 12%. The glass transition was $-25°$ C. G"/G' was about 63 when G' was 10 Pa.

EXAMPLE 4

400 ml of prepurified and degassed hexane was transferred into a stainless steel autoclave reactor with internal capacity of 1000 ml. The reactor had been maintained under slight positive argon atmosphere at all times. Consequently, 2 ml solution of 10% wt. methylaluminoxane in toluene, supplied by Aldrich, was transferred into the autoclave. 130 ml of prepurified hexene were added and the mixture was stirred until stable pressure was reached. The reactor was maintained at a pressure slightly above atmospheric. In succession, 100 g of prepurified propylene were added under stirring. The reactor mixture was heated to 70° C. At this reactor temperature premixed 4 mg of dimethylsilyl-bis(2-methyl-indenyl) zirconium dichloride (1 mg/1 ml of toluene) and 4 ml solution of 10 wt % methylaluminoxane in toluene were placed in the reactor. The polymerization was conducted for 30 minutes. The product which was soluble in hexane was precipitated twice in acidified isopropanol. Thereafter, the product was filtered and dried under reduced pressure for 24 hr. The same procedure was repeated several times to bring the total yield to 927 g.

The average composition as determined by NMR was 72.1% mole propylene and 27.9% mole hexene derived units. The average molecular weight and molecular weight distribution from GPC were: $Mn=29$ k, $Mw=58$ k, $Mz=91$ k, $Mw/Mn=2.0$.

Figure 1:
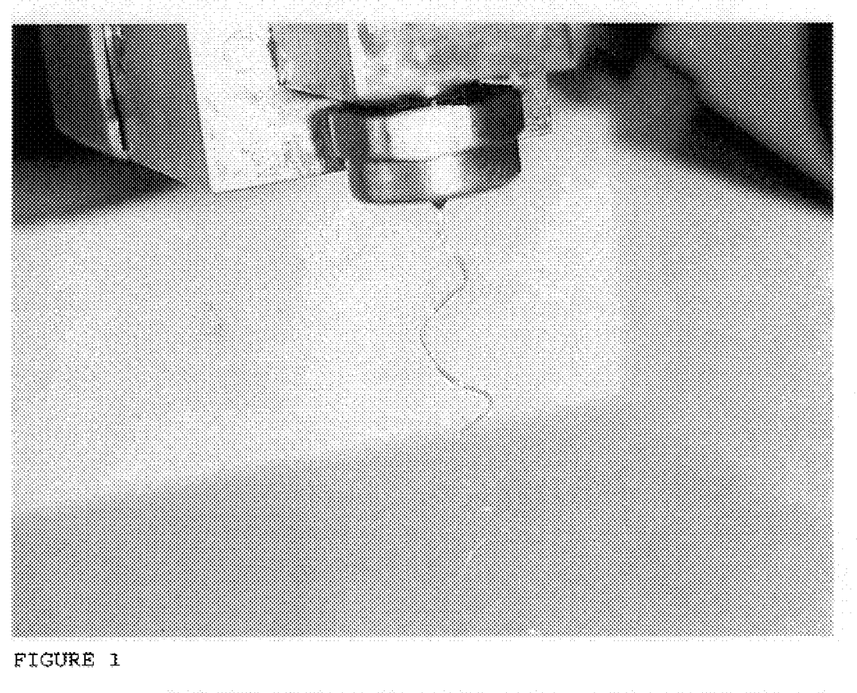
FIG. 1 is a picture of Rextac 2715 at 160° C./0.018 inch nozzle/simulated 242 m/min. A good spiral was obtained.
Figure 2:
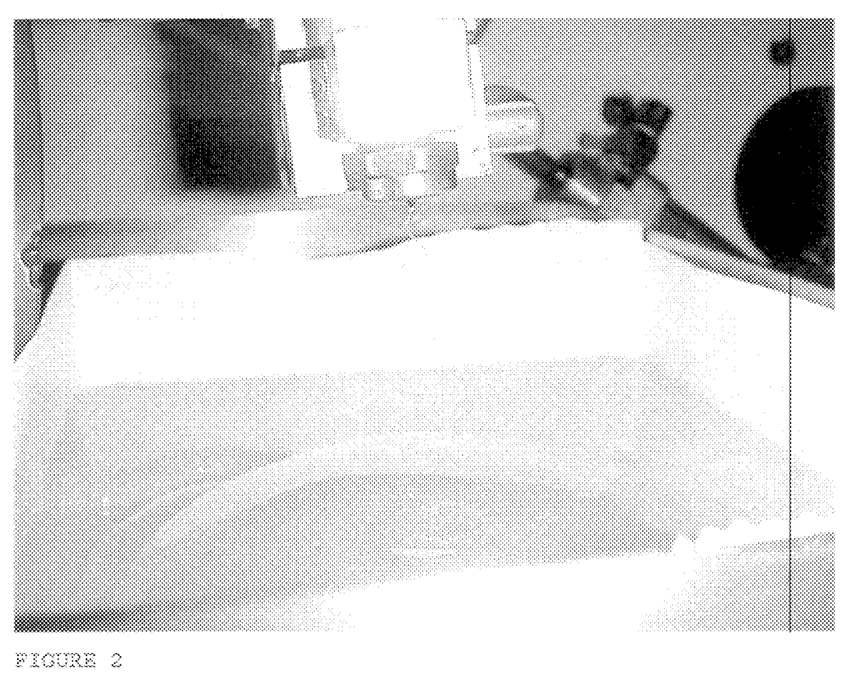
FIG. 2 is a picture of Rextac 2715 at 160° C./0.018 inch nozzle/simulated 450 m/min. An out of shape spiral was obtained.
Figure 3:
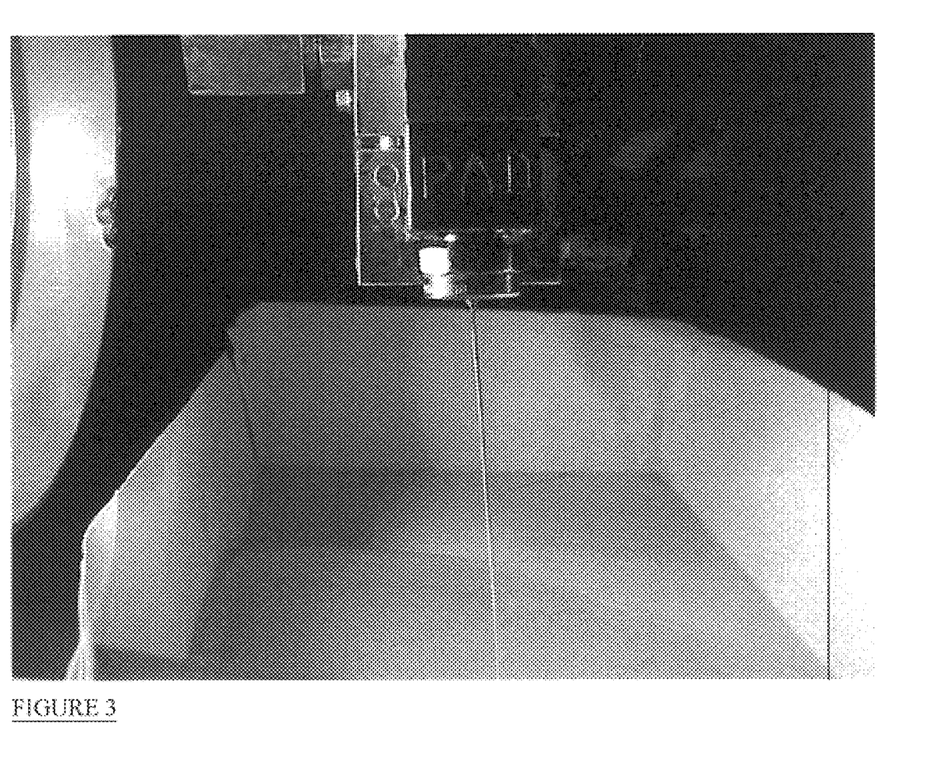
FIG. 3 is a picture of Example 4 at 160° C./0.018 inch nozzle. No air. Good polymer flow as shown by the straight jet obtained.
Figure 4:
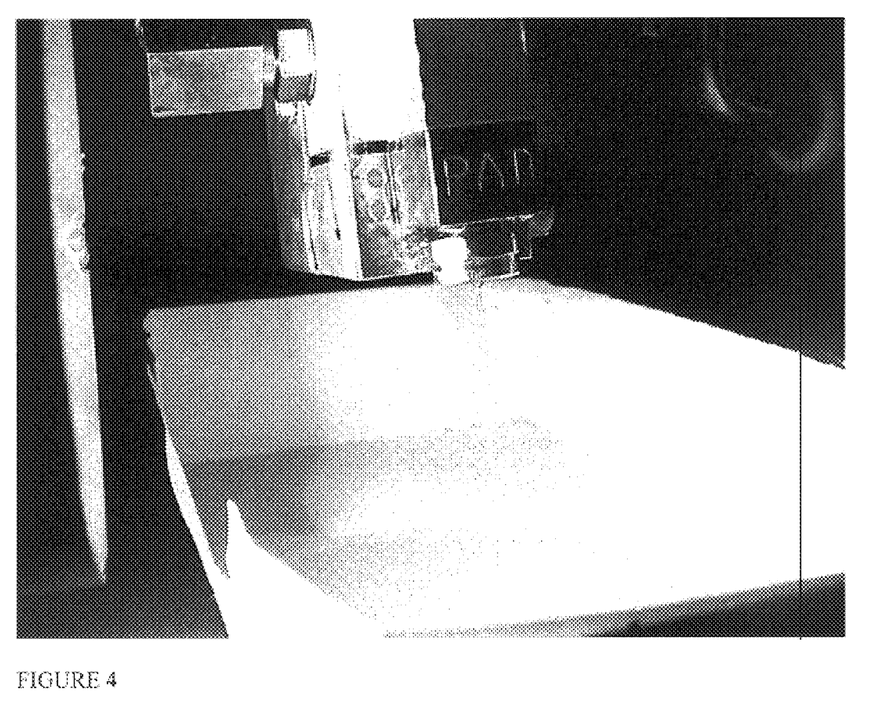
FIG. 4 is a picture of Example 4 at 160° C./0.018 inch nozzle/simulated 770 m/min. A good spiral was obtained with the same nozzle at a much higher simulated speed than Rextac.
Figure 5:
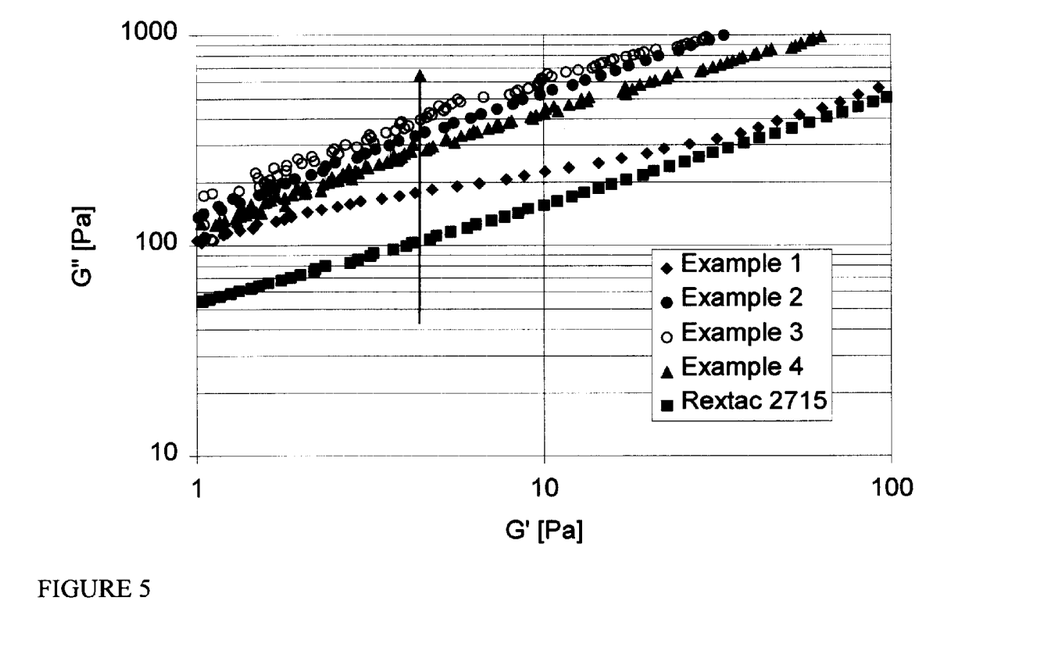
FIG. 5 is a plot of G" versus G' for Rextac 2715 and examples 1–4.

The DSC showed average $Tm=40°$ C. this melting point was observed only at the first heating (See FIG. 1). This due to the fact that the material crystallizes slowly (depending on the material crystallization can take days or even weeks). The average crystallinity during the first heating was 7.5%. The average glass transition was $-25°$ C. G"/G' was about 42, when G' was 10 Pa.

The G"/G' ratio of Rextac 2715 is about 16, when G' was 10 Pa.

Tables 1 and 2 summarize the data:

TABLE 1

| Example | Transition metal compound | Co-catalyst | Al/Z4 mol ratio | Mol % C3= | Comonomer |
|---|---|---|---|---|---|
| 1 | dimethylsilyl-bis(2-methyl-indenyl)zirconium dichloride | MAO | 1200 | 90.6 | Hexene |
| 2 | dimethylsilyl-bis(2-methyl-indenyl)zirconium dichloride | MAO | 800 | 86.6 | Hexene |
| 3 | dimethylsilyl-bis(2-methyl-indenyl)zirconium dichloride | MAO | 1200 | 79.1 | Hexene |
| 4 | dimethylsilyl-bis(2-methyl-indenyl)zirconium dichloride | MAO | 800 | 72.1 | Hexene |

MAO = methylalumoxane

TABLE 2

| example | Mole % C6 | Tm (° C.) | Tc (° C.) | % X | Tg (° C.) | Mw × 1000 | Yield (g) |
|---|---|---|---|---|---|---|---|
| Rextac RT 2715 | | 76 | | | −22 | 70 | |
| 1 | 9.4 | 73 | 6 | 11 | −19 | 39 | 1850 |
| 2 | 13.4 | 60 | 18 | 5 | −19 | 40 | 2190 |
| 3 | 20.9 | 42 | — | 12 | −25 | 40 | 1170 |
| 4 | 27.9 | 40 | — | 7.5 | −25 | 58 | 927 |

The polymers above were blended with 5000 ppm of Irganox 1010 and tested for their NWC/PE adhesion performance (diaper construction) and sprayability speed limit, according to the conditions of Table 4.

TABLE 3

|  | Rextac RT 2715 | Rextac RT 2730 | C3/C6 Ex 1 | C3/C6 Ex 2 | C3/C6 Ex 3 | C3/C6 EX 4 |
|---|---|---|---|---|---|---|
| Spray Speed limit (m/min) 0.018 inch | 350 (Good) | Not Sprayable | Not Sprayable | Not Sprayable | 750 (Fair) | 750 (Good) |
| Spray Speed limit (m/min) 0.030 inch | 700 (Good) | 550 (Good) | 600 (Good) | 600 (Good) | Not tested | Not tested |
| Adhesion NWC/PE (g/spiral) at RT after 1 day | 83 | 85 | 8 | 13 | 38 * | 65 |
| Adhesion NWC/PE (g/spiral) at 40° C. after 1 day | 45 | 65 | 7 | 21 | 23 * | 16 |

* Values have been found to decrease over time

TABLE 4

| CF 200 Controlled Fiberization Head on Meltex CT 325-150 Coater | Standard Machine Conditions for NWC-PE Diaper Construction | Standard Machine Conditions for Sprayability Speed Limit Determination |
|---|---|---|
| Substrates (Meltex) Unwind LEFT | PE[1] | PE[1] |
| Unwind RIGHT | NWC[2] | NWC[2] |
| Settings (Meltex) Melttank (° C.) | 160 | 160 |
| Hose (° C.) | 160 | 160 |
| Nozzle (° C.) | 160 | 160 |
| Nozzle ⌀ (Inch) | 0.018 | 0.018 |
| Air (° C.) | 160 | 160 |
| Webspeed (m/min) | 50 | Simulated by adapting the throughput |
| Spiral ⌀ (cm) | 2.0 | 2.0 |
| Add-On (g/m²) | 5 | 5 |
| Exp. determined Pumpspeed (RPM) | Adapted to get desired add-on at 50 m/min machine speed | Adapted to get desired add-on at the simulated machine speed |
| Throughput (g/min) | 5.1 | Adapted to get desired add-on at the simulated machine speed |

[1]PE PolyEthylene (Tacolin 25 Micron.)
[2]NWC Non Woven Coverstock (Lohman Paratherm PT 120/20)

To illustrate the general case of component addition to the base polymer, an example blend was created and tested for its sprayability. A series of propylene hexene copolymers were synthesized by the general procedure described below utilizing an SSC catalyst. A blend of these polymers was created and diluted with 20% Kaydol (tm) USP Mineral Oil, available from Witco Corporation located in Greenwich, Conn. The mixture exhibited 725 cps viscosity and good cohesive strength. This material was melted and placed in a Meltex coater equipped with Nordson CF 200 Series spray nozzles. Good spiral spray patterns were achieved with 0.030 inch and 0.018 in diameter nozzles and at temperatures that ranged from 140° C. to 160° C.

Polymerization Procedure:
Catalyst Activation. Polymerization catalyst solutions were prepared by preactivation of the metallocene complex with dimethylanilinium-tetrakis(pentafluorophenyl)borate [DMAH$^+$B(Pfp)4$^-$] in toluene under an inert atmosphere. The mixture was allowed to equilibrate with stirring until complete solution was achieved (approximately 20 minutes) and then sealed for transfer to the delivery vessel. The catalyst was pumped to the reactor from the vessel at a controlled rate using a calibrated HPLC pump. In this example, $\mu$-Me$_2$Si(Indenyl)$_2$HfMe$_2$ (185 mg, 0.374 mmol) was activated in the manner described above with [DIMAH$^+$ B(pfp$_4$)] (300 mg, 0.375 mmol) in toluene (900 mL). Hexanes and scavenger, triisobutylaluminum (112 mL/hr, 0.276 mmol/hr), were pumped (6.0 L/hr) into the 0.5 liter, liquid-filled, stirred tank reactor while the temperature was equilibrated to 90° C. using steam/water flowing through the reactor jacket. The pre-activated catalyst solution (9.0 mL/hr, 0.0255 mmol/hr) was pumped into the reactor for approximately 20 minutes before introduction of the monomers. Propylene (600 g/hr, 14.3 mol/hr) and 1-hexene, were introduced to the reactor as a chilled solution in the hexane's solvent stream. The rate of 1-hexene addition was varied from 30 to 105 g/hr (0.36 to 1.25 mol/hr). Commencement of polymerization activity was evidenced by a drop in the temperature of the water entering the reactor jacket. Continuous flow was established at a constant temperature with stirring. After the onset of polymerization, a minimum of 30 minutes was allotted for the establishment of steady state conditions. The polymerization temperature was also varied (80 to 90° C.) to afford, after equilibration, polymers of varying composition and molecular weight. The effluent, consisting of solvent, unreacted monomers, and polymer, was collected in individual aliquots after equilibration. devolitilization of the obtained mixtures yielded a solid product. The product showed melt viscosities ranging from 330 to 1510 cps @ 190° C.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A process for atomizing, spiral spraying, oscillation spraying or melt blowing copolymers onto a substrate comprising selecting a poly-alpha olefin inter-polymer comprising:
   A) from 60 to 94 mol % of units derived from an alpha mono-olefin having from 3 to 6 carbon atoms and
   B) from 6 to 40 mol % of units derived from ethylene or one or more other mono-olefins having from 4 to 10 carbon atoms and at least one carbon atom more than A); and
   C) optionally from 0 to 10 mol % of units derived from another copolymerizable unsaturated hydrocarbon, different from A) and B);
   wherein the inter-polymer has:
   i) an Mw/Mn of 6 or less;
   ii) a storage modulus G', determined upon cooling, intersecting a value of 0.3 M Pa at a temperature of less than 85° C. measured at a frequency of 1 Hz;
   iii) a G"/G' ratio of 18 or more when G' is 10 Pa; and
   iv) a viscosity of 5000 mPa·sec or less at 190° C., and atomizing, spiral spraying, oscillation spraying or melt blowing the inter-polymer onto a substrate.

2. The process of claim 1 in which the content of B) combined with C) is at least 8 mol % and is less than 40 mol % and the storage modulus G' of said inter-polymer intersects a value of G' of 0.3 MPa at a temperature of less than 70° C., when measured at 1 Hz.

3. The process of claim 1 wherein the reactivity ratio of component A) to component B) has a value of $R_A \times R_B$ of less than 1.4, where $R_A$ is the reactivity ratio of component A) over component B) and $R_B$ is the ratio of component B) over component A).

4. The process of claim 1 wherein the inter-polymer has a weight average molecular weight of 20,000 to 120,000 and the storage modulus G' of the inter-polymer intersects a value of 0.3 MPa at a temperature of less than 70° C. when measured at 1 Hz.

5. The process of claim 1 wherein A) is derived from propylene.

6. The process of claim 1 wherein B) is derived from units having from 4 to 8 carbon atoms.

7. The process of claim 5 wherein B) is derived from butene-1, hexene-1 and or octene-1.

8. The process of claim 1 wherein C) is derived from ethylene.

9. The process of claim 7 wherein C) is derived from ethylene.

10. The process of claim 1 wherein the inter-polymer has a melting behavior wherein the major peak melting point varies with content of component B) plus C) so that $T_m$ (interpolymer) is less than $153-2.78\times[C_{B+C}]$ for any given concentration of B) and/or C) components. Where Tm is the major melting peak of the interpolymer at a given content of components B) and C) in mol %; $[C_{B+C}]$ is the mol % of component B) plus C).

11. The process of claim 1 wherein
    units derived from A) are present at 65 to 94 mole %,
    units derived from B) are present at 6 to 35 mole %, and
    units derived from C) are present at 0 to 10 mole %.

12. The process of claim 1 wherein
    units derived from A) are present at 75 to 90 mole %,
    units derived from B) are present at 10 to 30 mole %, and
    units derived from C) are present at 0.5 to 5 mole %.

13. The process of claim 1 wherein
    units derived from A) are present at 87 to 73 mole %,
    units derived from B) are present at 12 to 25 mole %, and
    units derived from C) are present at 1 to 2 mole %.

14. The process of claim 1 wherein the inter-polymer has a heat of fusion of at least 5 J/g and no more than 40 J/g.

15. The process of claim 1 wherein the inter-polymer has a heat of fusion of at least 10 J/g and no more than 30 J/g.

16. The process of claim 1 wherein the inter-polymer has a major melting peak of at least 40° C. and no more than 130° C.

17. The process of claim 1 wherein the inter-polymer has a major melting peak of at least 40° C. and no more than 90° C.

18. The process of claim 1 wherein the inter-polymer has a Tg of −5° C. or less.

19. The process of claim 1 wherein the inter-polymer has a Tg between −5° C. and −40° C.

20. The process of claim 1 wherein the G"/G' ratio of is 20 or more when G' is 10 Pa.

21. The process of claim 1 wherein the G"/G' ratio is 22 or more when G' is 10 Pa.

22. The process of claim 1 wherein the inter-polymer has an Mw/Mn of 3 or less.

23. The process of claim 1 wherein the inter-polymer has an Mw/Mn between 2.5 and 1.6.

24. The process of claim 1 wherein the inter-polymer is sprayed at a machine speed of no less than 50 m/min.

25. The process of claim 24 wherein the inter-polymer being sprayed has a filament diameter of at least 0.2 mm and no more than 1.0 mm.

26. The process of claim 25 wherein the inter-polymer being sprayed has a spiral diameter of at least 8 mm and no more than 30 mm.

27. The process of claim 1 wherein the inter-polymer is sprayed at a machine speed of no less than 400 m/min.

28. The process of claim 27 wherein the inter-polymer being sprayed has a spiral diameter of at least 5 mm and no more than 40 mm.

29. The process of claim 27 wherein the inter-polymer being sprayed has a filament diameter of at least 0.3 mm and no more than 0.6 mm.

30. The process of claim 29 wherein the inter-polymer being sprayed has a spiral diameter of at least 10 mm and no more than 20 mm.

31. The process of claim 1 wherein the sprayed interpolymer has an adhesion to nonwoven coverstock or polyethylene film at about 20° C. of at least 5 g/spiral.

32. The process of claim 1 wherein the sprayed interpolymer has an adhesion to nonwoven coverstock or polyethylene film at about 20° C. of at least 10 g/spiral.

33. The process of claim 1 wherein the sprayed interpolymer has an adhesion to nonwoven coverstock or polyethylene film at about 20° C. of at least 35 g/spiral.

34. The process of claim 1 wherein the inter-polymer is produced from polymerization of the monomers (-A), B) and C)-) using a metallocene in combination with a co-catalyst.

35. The process of claim 1 wherein the comonomer comprises ethylene and or a $C_4$ to $C_{40}$ linear, cyclic or branched alpha-olefin.

36. The process of claim 1 wherein the comonomer comprises one or more of ethylene, butene, pentene, hexene, heptene, octene, nonene, decene, undecene, dodecene, 3,5,5-trimethyl hexene-1, 3-methylpentene-1, 4-methylpentene-1.

37. The process of claim 1 wherein the G"/G' ratio is 50 or more when G' is 10 Pa.

38. The process of claim 1 wherein the G"/G' ratio is 40 or more when G' is 10 Pa.

39. The process of claim 1 wherein the G"/G' ratio is 30 or more when G' is 10 Pa.

40. A process for spraying blends of propylene copolymers comprising selecting two or more different copolymers independently comprising propylene and up to 50 mole % comonomer, each copolymer independently having:

an Mw of between 20,000 to 100,000;

an Mw/Mn of 4 or less:, a G"/G' of 18 or more, when G' is 10 Pa;

a Tg of about -5° C. or less;

a Tm of about 90° C. or less;

an amorphous content of at least 50%, a crystallinity of less than 15%, a heat of fusion of at least 5 J/g a viscosity of 5000 mPa·sec or less at 190° C.; and a melting range of less than 75° C., combining the two or more copolymers, and optionally oil, into a blend; and atomizing, spiral spraying, oscillation spraying or melt blowing the blend onto a substrate.

41. A process for atomizing, spiral spraying, oscillation spraying or melt blowing a blend of propylene copolymers onto a substrate comprising selecting two or more different poly-alpha olefin inter-polymers wherein each polymer independently comprises:

A) from 60 to 94% of units derived propylene and

B) from 6 to 40 mol % of units derived from one or more of butene, hexene and octene; and C) optionally from 0 to 10 mol % of units derived from ethylene;

wherein each inter-polymer independently has:

i) a diad distribution of propylene in the inter-polymer showing a ratio of experimentally determined diad distribution over the calculated Bernoullian diad distribution of less than 1.07;

ii) a storage modulus G', determined upon cooling, intersecting a value of 0.3 M Pa at a temperature of less than 85° C. measured at a frequency of 1 Hz;

iii) a G"/G' ratio of 18 or more when G' is 10 Pa; and iv) a viscosity of 5000 mPa·sec or less at 190° C., and combining the inter-polymers into a blend and atomizing, spiral spraying, oscillation spraying or melt blowing the blend onto a substrate.

42. A process for atomizing, spiral spraying, oscillation spraying or melt blowing propylene copolymers onto a substrate comprising selecting a poly-alpha olefin inter-polymer comprising:

A) from 60 to 94% of units derived propylene and

B) from 6 to 40 mol % of units derived from one or more of butene, hexene and octene;

wherein the inter-polymer has:

i) a diad distribution of propylene in the inter-polymer showing a ratio of experimentally determined diad distribution over the calculated Bernoullian diad distribution of less than 1.07;

ii) a storage modulus G', determined upon cooling, intersecting a value of 0.3 M Pa at a temperature of less than 85° C. measured at a frequency of 1 Hz;

iii) a G"/G' ratio of 18 or more when G' is 10 Pa; and iv) a viscosity of 5000 mPa·sec or less at 190° C., and atomizing, spiral spraying, oscillation spraying or melt blowing the inter-polymer onto a substrate.

43. A process for atomizing, spiral spraying, oscillation spraying or melt blowing a blend of copolymers onto a substrate comprising selecting two or more different poly-alpha olefin inter-polymers wherein each inter-polymer independently comprises:

A) from 60 to 94 mol % of units derived from an alpha mono-olefin having from 3 to 6 carbon atoms and B) from 6 to 40 mol % of units derived from ethylene or one or more other mono-olefins having from 4 to 10 carbon atoms and at least one carbon atom more than A); and C) optionally from 0 to 10 mol % of units derived from another copolymerizable unsaturated hydrocarbon, different from A) and B);

wherein each inter-polymer has:

i) an Mw/Mn of 6 or less;

ii) a storage modulus G', determined upon cooling, intersecting a value of 0.3 M Pa at a temperature of less than 85° C. measured at a frequency of 1 Hz;

iii) a G"/G' ratio of 18 or more when G' is 10 Pa; and iv) a viscosity of 5000 mPa·sec or less at 190° C., and combining the inter-polymers into a blend, and atomizing, spiral spraying, oscillation spraying or melt blowing the blend onto a substrate.

44. A process for spraying propylene copolymers comprising selecting a hot melt adhesive composition comprising a copolymer comprising propylene and up to 50 mole % comonomer, said copolymer having an Mw of between 20,000 to 100,000;

an Mw/Mn of 4 or less:, a G"/G' of 18 or more, when G' is 10 Pa;

a Tg of about -5° C. or less;

a Tm of about 90° C. or less;

an amorphous content of at least 50%, a crystallinity of less than 15%, a heat of fusion of at least 5 J/g a viscosity of 5000 mPa·sec or less at 190° C.; and a melting range of less than 75° C., and atomizing, spiral spraying, oscillation spraying or melt blowing the hot melt adhesive selected onto a substrate.

45. The process of claim 44 wherein the copolymer has a melting range of 50° C. or less.

46. The process of claim 44 wherein the G"/G' ratio is 20 or more when G' is 10 Pa.

* * * * *